United States Patent
Kehl et al.

(10) Patent No.: US 9,207,077 B2
(45) Date of Patent: Dec. 8, 2015

(54) CONSTRUCTION LASER SYSTEM COMPRISING A ROTATION LASER AND A LASER RECEIVER, AND METHOD

(75) Inventors: Anton Kehl, Rüthi (CH); Bernd Stöckel, Altstätten (CH); Martin Winistörfer, Hinterforst (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 159 days.

(21) Appl. No.: 13/884,597

(22) PCT Filed: Nov. 8, 2011

(86) PCT No.: PCT/EP2011/069635
§ 371 (c)(1),
(2), (4) Date: Aug. 2, 2013

(87) PCT Pub. No.: WO2012/062746
PCT Pub. Date: May 18, 2012

(65) Prior Publication Data
US 2013/0298413 A1    Nov. 14, 2013

(30) Foreign Application Priority Data
Nov. 10, 2010   (EP) ..................................... 10190617

(51) Int. Cl.
*G01C 15/00* (2006.01)
(52) U.S. Cl.
CPC .............. *G01C 15/00* (2013.01); *G01C 15/004* (2013.01)
(58) Field of Classification Search
CPC .... G01C 15/00; G01C 15/002; G01C 15/004; G01C 15/006
USPC .................................................... 33/286, 290
See application file for complete search history.

(56) References Cited

U.S. PATENT DOCUMENTS 4,240,208 A    12/1980   Pehrson
4,245,800 A *  1/1981   Henderson ................... 244/3.13
(Continued)

FOREIGN PATENT DOCUMENTS

CN    2756614 Y    2/2006
CN    2756714 Y    2/2006
(Continued)

OTHER PUBLICATIONS

European Search Report dated Mar. 15, 2011 as received in Application No. EP 10 19 0617.

*Primary Examiner* — Christopher Fulton
(74) *Attorney, Agent, or Firm* — Maschoff Brennan

(57) ABSTRACT

A construction laser system comprising at least one rotation laser which has a laser unit and a rotatable deflection means, a laser receiver has a laser beam detector which is designed to generate an output signal when the laser beam impinges on the laser beam detector. An evaluation unit for determining the position of the laser receiver relative to the reference surface and an indicator for the determined position. A controller where a known emission pattern is generated over a sequence of a plurality of revolutions by varying the emission of the laser beam in a manner temporally coupled to the revolution period of the deflection means, and the evaluation unit is designed to identify the reference surface using a sequence of output signals which are each generated by the laser beam detector when the rotating laser beam repeatedly successively impinges, which sequence corresponds to the known emission pattern.

21 Claims, 2 Drawing Sheets

(56) References Cited

U.S. PATENT DOCUMENTS

| | | | |
|---|---|---|---|
| 4,820,041 A * | 4/1989 | Davidson et al. | 356/3.12 |
| 5,100,229 A * | 3/1992 | Lundberg et al. | 356/3.12 |
| 5,137,354 A * | 8/1992 | deVos et al. | 356/141.3 |
| 5,239,400 A * | 8/1993 | Liu | 398/95 |
| 5,294,970 A * | 3/1994 | Dornbusch et al. | 356/141.1 |
| 5,953,108 A | 9/1999 | Falb et al. | |
| 6,052,181 A | 4/2000 | Maynard et al. | |
| 6,314,651 B1 | 11/2001 | Ohtomo et al. | |
| 6,381,006 B1 * | 4/2002 | Ramstrom | 356/4.01 |
| 7,394,527 B2 | 7/2008 | Essling et al. | |
| 7,589,829 B2 | 9/2009 | Yamazaki et al. | |
| 8,087,176 B1 * | 1/2012 | Hayes et al. | 33/280 |
| 8,269,984 B2 * | 9/2012 | Hinderling et al. | 356/614 |
| 8,319,687 B2 * | 11/2012 | Kahle | 342/458 |
| 8,711,369 B2 * | 4/2014 | Campagna | 356/614 |
| 2013/0293705 A1 * | 11/2013 | Schorr et al. | 348/135 |

FOREIGN PATENT DOCUMENTS

| | | |
|---|---|---|
| CN | 101261124 A | 9/2008 |
| CN | 201751076 U | 2/2011 |
| DE | 699 28 203 T2 | 11/2006 |
| EP | 1 524 497 A1 | 4/2005 |
| EP | 2 199 739 A1 | 6/2010 |

* cited by examiner

CONSTRUCTION LASER SYSTEM COMPRISING A ROTATION LASER AND A LASER RECEIVER, AND METHOD

FIELD OF THE INVENTION

The invention relates to a construction laser system comprising a rotation laser and a laser receiver, to a rotation laser and a laser receiver for such a system and to a method for determining a position of a laser receiver relative to a reference surface—defined by a rotating laser beam.

BACKGROUND

It is known to use construction lasers (also called rotation lasers) at construction sites e.g. of buildings, in order to define reference points and reference lines on surfaces such as e.g. walls, floors or ceilings in particular in the case of work for interior finishing such as installations of pipelines and power lines or windows, positioning furniture, hanging pictures, etc. In particular, rotation lasers are used in which a laser beam (in the visible or infrared wavelength range) emitted by a laser unit produces a reference surface by deflection via a rotating deflection prism, a precise height reference then being provided by said reference surface. If a laser beam in the visible spectrum is emitted in this case and if this rotating laser beam in this case impinges on a surface such as e.g. a wall, a floor or a ceiling of the building, a reference line is visible there as a basis for further measures.

For precisely transmitting the reference height specified by the laser surface e.g. onto a wall, laser receivers capable of being handheld are known which can determine and indicate a position relative to a reference surface highly accurately.

Laser receivers capable of being handheld that are known from the prior art and serve for determining a position relative to the reference surface can in this case have a laser beam detector comprising a multiplicity of photosensitive elements, said laser beam detector being designed for generating an output signal when the laser beam impinges on the laser beam detector. In detail, the laser beam detector is designed in this case such that in addition an impingement position of the laser beam on the laser beam detector surface can be derived, for which purpose the photosensitive elements—considered in an upright operating position of the apparatus—can be strung together in a vertically aligned sensor line. In addition, usually an evaluation unit for determining the position of the laser receiver relative to the reference height defined by the rotating laser beam on the basis of the output of the laser beam detector and also an indicator for the position determined (for instance a visual display), in particular designed for indicating whether the laser receiver exactly coincides with the reference surface, are integrated into the laser receiver apparatus. In this case, the position can be determined for example on the basis of a ratio of a plurality of output signals (e.g. as the midpoint of that region on the laser beam detector surface which is illuminated by the laser beam).

Such laser receivers capable of being handheld can be used, in particular, when the line imaged on the wall by the rotating laser beam is discernible only with difficulty or not precisely enough by eye. This is e.g. the case for instance when there are relatively large distances between rotation laser and the wall (e.g. owing to a divergence of the laser beam [→imaged line becomes too wide] or a low light power [→imaged line becomes too weakly visible], which are set in this way in particular for eye safety reasons) or when laser light in the non-visible wavelength range is used.

In such cases, laser receivers of this type then make it possible to find the laser beam and to indicate and read the laser plane (or reference height) defined by a rotating laser beam and to transmit the height information onto a wall. By way of example it is possible—in a manner indicated by the laser receiver—to apply a corresponding marking (such as a pencil line) at the reference height on the wall.

For this purpose, on the part of the user, the laser receiver is for example moved up and down in a searching manner in a vertical direction and, finally, is brought into that position in which the indicator indicates coincidence with the reference surface. By way of example, the indicator provided can be a visual display which (for instance by means of luminous arrows or different-colored LEDs) gives information about whether a defined zero point of the laser receiver (e.g. a surface midpoint of the detector surface) is situated
 exactly at the level of the reference surface,
 above the reference surface or
 below the reference surface.

Examples of such laser receivers are disclosed in the documents EP 2 199 739 A1 and U.S. Pat. No. 4,240,208.

In order to provide for the user a simple transmission of the reference height determined and indicated by the laser receiver, a height mark can be provided on the housing of the laser receiver at the level of the defined zero point (e.g. a notch or an imprinted line laterally on the housing).

As described in EP 2 199 739 A1, the laser receiver can also itself have a laser fan emitter in such a way that a horizontal laser fan is emitted laterally at the level of the laser plane which is defined by the rotating laser beam and which is detected on the part of the receiver. Consequently, the height information defined by the rotating laser beam is amplified and/or forwarded. This makes it possible to generate sharp and clear reference lines e.g. on a wall, even though the rotation laser itself is far away or even situated in another room.

U.S. Pat. No. 7,394,527 discloses a system comprising laser emitter and laser receiver, wherein a distance between the laser receiver and the laser emitter is intended to be determined. For this purpose, it is proposed to emit two mutually parallel laser beams in a rotating fashion and to determine the distance depending on rotational speed and time offset of the directly successively received laser pulses of the two laser beams. Analogously to this—given the presence of a plurality of detector strips offset parallel to one another on the part of the receiver (with a precisely known parallel offset of the detector strips with respect to one another)—alternatively it is also possible to emit a single laser beam in a rotating fashion, in which case the distance between the receiver and the laser emitter is then determined depending on the time offset of the laser pulses received successively by the respective detector strips.

U.S. Pat. No. 5,953,108 discloses a system comprising rotation laser and laser receiver, wherein the laser beam rotates at a first speed if no message is being communicated to the laser receiver, and rotates at a second speed, different from the first rotational speed, in order thereby to communicate a predefined message with regard to a status state of the rotation laser (e.g. "weak battery").

In all of the systems described previously, however, it can happen that when more than one rotation laser is used on a construction site, the laser receiver receives and identifies a laser beam emitted by a different rotation laser from the one actually intended. Therefore, there is the risk that an incorrect reference height will be indicated by the laser receiver, this incorrect reference height will be transmitted onto a wall and as a result, finally, possibly even the entire construction project (such as e.g. installation of windows at a predetermined room height) will be performed erroneously.

Laser receivers are additionally known which are precisely designed for and coordinated with rotation lasers having certain properties and react and ultimately indicate the height of a laser plane only if the rotation laser generating the laser plane meets certain requirements, e.g. if the fixed rotational speed of the rotation laser lies within a predetermined range, if the wavelength of the laser beam lies within a certain wavelength range or if the received laser beam is modulated with a defined modulation scheme. A use of an apparatus combination comprising rotation laser and laser receiver which, however, are not already designed for and coordinated with one another in respect of hardware is thereby made impossible, however, even if this ensures, in principle, a relatively simple and unambiguous assignment of the apparatuses on a construction site. By way of example, U.S. Pat. No. 6,052,181 discloses a system comprising rotation laser and laser receiver in which the laser beam emitted by the rotation laser is amplitude-modulated and contains a modulated identification data stream and other user data. The laser receiver demodulates the received laser beam immediately after the latter impinges thereon, and has a special detector for reading out the modulated data and thus for identifying or indicating the height level.

SUMMARY

A main problem that arises in the prior art in the case of such apparatus combinations already precisely coordinated with one another beforehand resides in the low flexibility when exchanging receiver or rotation laser and also in the low modularity or combinability with comparable components. A further problem is the poor possibility of short-term reaction to specific conditions e.g. on site at a construction site.

Therefore, it is an object of the invention to reduce or eliminate the problems mentioned. It is a specific object to provide such an apparatus combination or the individual components therefor in which the individual components (namely laser receiver and rotation laser) can also be combined and extended with further, similar generic individual components in a simple manner, and wherein a reliable identification of the individual components among one another during the use thereof is nevertheless made possible. Specifically, the intention here is to make it possible in a simple manner to attune the apparatuses mutually to one another (i.e. to bring about an unambiguous cooperation of the apparatus combination) in a user-friendly manner only shortly before said apparatuses are used, without this necessitating that diverse components of the two interacting apparatuses be coordinated with one another in respect of hardware in a predefined manner and in a manner that makes modularity impossible (e.g. with regard to the wavelength or the manner of modulation of the laser beam with corresponding hardware design of the laser source on the emitter side and/or of the laser beam detector on the receiver side).

From a general standpoint, therefore, there is a need for an improved construction laser system comprising a rotation laser and a laser receiver, wherein the laser receiver, in a more flexible and less complex manner which is adaptable to external conditions in the short term, is able to reliably and robustly identify a laser plane generated by the rotation laser, even given the presence of receivable disturbing laser beams or a plurality of receivable reference surfaces generated e.g. by further rotation lasers installed on the construction site. A further object is to provide a corresponding method for reliably and robustly determining a position of laser receiver relative to a desired reference surface, even given the presence of receivable disturbing laser beams or a plurality of receivable reference surfaces generated e.g. by further rotation lasers installed on the construction site.

The construction laser system according to the invention comprises at least a rotation laser having a laser unit and a rotatable deflection means and serving for emitting a rotating laser beam, wherein the rotating laser beam defines a reference surface, and a laser receiver for determining a position relative to the reference surface. In this case, the laser receiver has a laser beam detector designed for generating an output signal when the laser beam impinges on the laser beam detector. In addition, an evaluation unit for determining the position of the laser receiver relative to the reference surface and also an indicator for the position determined, in particular designed for indicating whether the laser receiver exactly coincides with the reference surface, are present.

In this case, the invention breaks with the prior art by virtue of the rotation laser and the laser receiver being designed and coordinatable with one another in such a way that the generated reference surface can be clearly identified as this from a set of light beams receivable on the part of the laser receiver (in particular from further generated reference surfaces). In detail, this is achieved by varying the emitting of the rotating laser beam in such a way that as a result at least in the direction of the laser receiver a known emission pattern is generated over a sequence of revolutions of the rotating laser beam, and identifying the reference surface on the basis of a sequence of output signals generated by the laser beam detector in each case when the rotating laser beam repeatedly successively impinges, which sequence corresponds to the known emission pattern.

From a structural standpoint—on the part of the rotation laser—for this purpose a controller for the laser unit of the rotation laser is provided, which controller is designed in such a way that a known emission pattern is generated over a sequence of a plurality of revolutions by varying the emission of the laser beam in a manner temporally coupled to the revolution duration of the deflection means. In this case, the controller can be advantageously integrated into the rotation laser (i.e. the rotation laser apparatus). The reference surface is identified with the aid of the evaluation unit, which in particular is integrated into the laser receiver, on the basis of a sequence of output signals which are generated by the laser beam detector in each case when the rotating laser beam repeatedly successively impinges, wherein criteria corresponding to the known emission pattern are identified e.g. from said sequence of output signals.

In this case, the rotating laser beam emitted by the rotation laser is incident on the laser light sensor of the laser receiver only ever for a short time in the form of laser pulses, such that the output signals are generated as electrical outputs corresponding to the incidence of the laser beam. Since the electrical outputs form a pattern identical to the pattern with which the laser beam is incident on the receiver, these pattern can be processed further, that is to say that it can be detected and compared with a stored patterns. If the two patterns are identical to one another, the laser receiver establishes that the laser pulse originates from the assigned rotation laser and enables further method steps to be carried out.

The rotating laser beam therefore impinges on the laser receiver in an impinging rhythm dependent on the revolution duration of the deflection means. Advantageously, the controller can then vary the emission of the laser beam in such a way that—as the known emission pattern—in the context of the impinging rhythm upon every n-th impingement of the rotating laser beam on the laser receiver an output signal is generated by the laser beam detector, which signal differs from the remaining output signals generated in the context of the impinging rhythm.

Specifically, in this case, the evaluation unit is designed for comparing the sequence of output signals generated with comparison criteria indicated by the known emission pattern, in particular wherein the comparison criteria—which correspond to the known emission pattern—are already stored in the evaluation unit beforehand and the rotation laser and the laser receiver are thereby coordinated with one another. However, it is also the case that a plurality of schemes for comparison criteria that correspond to different emission patterns can be stored beforehand and—depending on the reference surface sought (or the desired reference height provided by the corresponding rotation laser)—a selection function on the part of the user for the corresponding comparison criteria corresponding to the emission pattern of the reference surface sought can be provided, such that the user can input and choose beforehand what reference surface or reference height (from what rotation laser) is then intended to be found or indicated with the aid of the laser receiver.

In order to achieve the above-described effect that in the context of the impinging rhythm every n-th output signal generated on the receiver side differs from the remaining output signals generated in the context of the impinging rhythm, the controller can be designed in particular in such a way that—as the known emission pattern—the laser beam, upon every n-th revolution, for the duration of one revolution, is emitted with a light power lying outside a defined standard light power range or is not emitted at all (i.e. is emitted with a light power of zero), wherein n can be chosen to be an integer between 3 and 10.

In other words, therefore, the rotation laser can be designed to form the emission pattern of the rotating laser beam emitted by the rotation laser in the direction of the laser receiver by means of sequences of uniformly emitted laser pulses, of which at least one laser pulse (e.g. every n-th) is changed.

For the case in which the laser beam is emitted with a light power lying outside the standard light power range upon every n-th revolution, said laser beam can advantageously be emitted with a light power that significantly falls below the standard light power range upon every n-th revolution.

Furthermore, in this case, the controller can be designed in such a way that the laser beam is emitted with a light power lying within the standard light power range upon the other revolutions apart from upon the every n-th revolution—i.e. for the duration of these other revolution —, in particular wherein the laser beam is emitted with constant light power as standard light power upon the other revolutions.

In a manner coupled with the described control, on the part of the rotation laser, of the emission of the rotating light beam, on the part of the laser receiver the evaluation unit can now recognize and identify the reference surface (and for this purpose be designed programmatically for identification on the basis of the following aspect) from the fact that in the sequence of output signals every n-th output signal has an amplitude that differs from the amplitudes of the other output signals, or that every n-th output signal fails to appear in the sequence of output signals (the latter applies to the case where the laser beam, upon every n-th revolution, is not emitted at all—i.e. is emitted with a light power of zero—or at least is not emitted in a measurable manner with the aid of the laser beam detector).

By way of example, the rotating laser beam can also be emitted with at least one first wavelength in the visible range and one second wavelength in the invisible range (e.g. in the infrared), wherein the invention-specified control of the emission and generation of the emission patterns only relates to the second partial emission of the laser beam in the invisible range.

What can thereby be achieved is that the projection point—running along the wall—of the rotating laser beam—despite varying emission and generation of the emission pattern—remains visible to the human eye uniformly without interruption. Nevertheless, on the part of the laser receiver an unambiguous identification of the reference surface generated by the rotating laser beam emitted in a varying fashion can be ensured according to the invention by the evaluation of that sequence of output signals which are generated when the laser beam components in the second, invisible wavelength range impinge.

In other words, the rotation laser can therefore be designed to form the emission pattern of the rotating laser beam emitted by the rotation laser in the direction of the laser receiver by means of sequences of uniformly emitted laser pulses, of which at least one laser pulse is varied—in particular with regard to its intensity. By varying a laser pulse it is easy to produce a multiplicity of possible, unambiguously distinguishable patterns, which enables a simple assignment of the respective pattern to a specific rotation laser. Furthermore, the rotation laser can be designed to completely suppress the at least one varied laser pulse, or to emit the at least one varied laser pulse with a signal amplitude that differs from the rest of the laser pulses. In this case, it is possible to cause a laser pulse to be completely omitted, e.g. by the laser beam being switched off or interrupted by a cover during every n-th revolution of the deflection prism. On account of the customary rotational speeds, n can be 5 for example, that is to say that every 5th pulse can be omitted in order to generate an unambiguous pattern. Alternatively, the signal amplitude of the laser beam can also be reduced or even amplified e.g. by 25%, 50%, or 75%, upon every n-th revolution.

If, by way of example, upon every third or fifth revolution, the intensity of the rotating laser beam is decreased e.g. for one or two revolutions, then a sequences of light pulses whose amplitudes correspond to the variation of the intensity of the rotating laser beam also correspondingly impinges on the receiver. That is to say that on the basis of the varying amplitudes of the received light pulses (or of the output signals generated therefrom) a coded emission pattern can then be recognized and identified on the receiver side. If, purely by way of example, the laser beam is emitted with a continuous emission pattern of four revolutions with the intensity of one (normalized as standard light power) and one revolution with the intensity of 0.25 (that is to say 25% of the standard light power), then this defined emission pattern can be recognized again in the sequence of light pulses impinging on the receiver side (or output signals generated therefrom) by virtue of the fact that—considered in the context of five successive light pulses (or output signals)—the amplitude of one of the five light pulses (or output signals) is significantly below the amplitude of the remaining four light pulses (or output signals). On the basis of the sequence of the light pulses impinging on the receiver side (or the generated output signals), it is therefore possible to identify the known emission pattern having a continuously varying intensity in a simple manner by comparison with corresponding, defined criteria with regard to the amplitudes of the light pulses or output signals (as corresponding comparison criteria).

In accordance with a further aspect, it is additionally possible, in particular, that the revolution rate of the deflection means can optionally be set to different fixed values within a rotation rate range of between 7 and 20 revolutions per second (in particular 7 to 13 revolutions per second), and the evaluation unit can in this case be designed for further identifying the reference surface additionally on the basis of the time intervals between the individual output signals within the sequence of output signals generated. In this case, the output signals form the electrical output of the laser beam detector that is generated depending on the impingement of a laser beam (and the impingement point thereof or the impingement partial area thereof on the detector surface).

Advantageously, the rotation laser can therefore also be designed, by means of additionally changing a rotational speed of its deflection prism, to emit the pattern as a predetermined number of laser pulses in the direction of the laser receiver by means of the rotating laser beam within a predetermined time period. It is thus possible, even though the same pattern can be emitted by different rotation lasers, to unambiguously determine the rotation laser by means of a simple change in the rotational speed of the rotation laser.

Furthermore, as known emission pattern, as an alternative or in addition to the variation—effected over a sequence of revolutions—of the intensity of the emitted rotating laser beam—it is also possible to vary the revolution speed of the rotating laser beam over a sequence of revolutions as known emission pattern. If, by way of example, upon every third or fifth revolution, the revolution speed is increased e.g. for one or two revolutions, then a sequences of light pulses whose time intervals correspond to the variation of the revolution speed also correspondingly impinges on the receiver. That is to say that on the basis of the varying time interval between the received light pulses (or the output signals generated therefrom), a coded emission pattern can then be recognized and identified on the receiver side. If, purely by way of example, a laser beam is emitted with a continuous emission pattern of three revolutions with the revolution speed of 10 rps and two revolutions with the revolution speed of 15 rps, this defined emission pattern can be recognized again in the sequence of light pulses impinging on the receiver side (or output signals generated therefrom) by virtue of the fact that—considered in the context of six successive light pulses (or output signals)—two of the time intervals between the respectively adjacent light pulses (or output signals) are 10 ms, one of the time intervals is 6.66 ms and the two remaining time intervals are anywhere between 6.66 ms and 10 ms—in any case 16.66 ms in total—(depending on the position of the laser receiver relative to the rotation laser or depending on the angular position at which the rotational speed is respectively increased and decreased). On the basis of the sequence of the light pulses impinging on the receiver side (or the generated output signals), it is therefore possible to identify the main emission pattern having a continuously varying rotational speed in a simple manner by comparison with corresponding, defined criteria with regard to the time intervals between the light pulses or output signals (as corresponding comparison criteria).

In this connection, it should also be mentioned that the invention is also suitable, in principle, for a system comprising more than one rotation laser and/or more than one receiver, if different patterns or their corresponding comparison criteria to be applied are stored in the receiver or receivers. Since, in the case of a rotational speed of a deflection prism of 10 rps, a pulse spacing is in the region of one tenth of a second, while a pulse duration is approximately 5 µs, the individual pulses of different rotation lasers which are incident at different points in time are easily distinguishable without the use of complicated circuit arrangements.

Advantageously, the rotation laser can have means for setting a specific pattern which is emitted by the rotation laser. Likewise, the laser receiver can then have means for setting the specific pattern, whereby the evaluation unit, functioning as a comparison and assignment device, is able to recognize the specific pattern and assign it to the rotation laser.

In addition, the laser receiver can also have in particular—as explained in greater detail below—a learning function in order to learn and to store a pattern created by the rotation laser as a reference pattern.

By way of example, provision can be made for setting different patterns by means of switches at the rotation laser and the laser receiver. However, it is also possible that the rotation laser can, in principle, create only one individual pattern, and then the laser receiver is set to this individual pattern. However, it is also conceivable for the settable or fixedly available pattern of the rotation laser to be transmitted to the laser receiver via cable or in a wireless manner, said laser receiver learning said pattern as a reference pattern before the apparatuses are used. In this case, the pattern can also be transmitted in a coded manner. The pattern respectively set at the laser receiver or the pattern transmitted thereto then corresponds to the stored pattern which, during operation with the laser receiver, is compared with the pattern then detected.

Setting means can, however, also be memory cards such as e.g. compact flash cards, SD cards or USB sticks, on which a pattern is stored. The memory cards can be inserted into the rotation laser and the laser receiver before the operation of the system. Transmissions from the rotation laser to the laser receiver via cable or else wireless solutions such as WLAN, Bluetooth, infrared or radio can likewise be considered.

In addition, it is also possible to assign more than one laser receiver to the rotation laser since, after all, the pattern can be defined by the rotational speed of the deflection prism and the varying of the laser beam during a revolution of the deflection prism. Consequently, the same pattern can be emitted in all directions of a 360° full circle and any desired number of laser receivers can recognize the same pattern.

By virtue of the additional criterion of the differently settable revolution rate or revolution duration, the reference surface can, if appropriate, be distinguished even more reliably from other reference surfaces or from disturbing laser beams received at the laser receiver, and can thus be identified more robustly. By way of example, this can also be used for adding further possibilities of differentiation for the reference surfaces. Thus, in the context of a road building project, it can happen for example that the following are installed in the site area a first rotation laser for generating a first reference plane at a first height, which is required for the earth straightening machines and for the construction of the roads, a second rotation laser for generating a second reference plane at a second height, which is required for the asphalt rolling machines and for the construction of the roads, a third rotation laser for generating a third reference plane at a third height, which is required for the earth straightening machines and for the construction of the sidewalks, a fourth rotation laser for generating a fourth reference plane at a fourth height, which is required for the asphalt rolling machines and for the construction of the sidewalks.

According to the invention, e.g. all rotation lasers which are installed on a construction site and which are intended to reference a height for producing the road can now be set to a revolution rate of 8 revolutions per second, and further rotation lasers intended to reference an extension height for the adjacent sidewalk can be set to a revolution rate of 12 revolutions per second. In addition, for the different construction machines—depending on the type of production machine—it is possible to generate different emission patterns (e.g.: reference height for asphalt rolling machines is generated with a pattern in which the rotating laser beam is emitted with a significantly reduced light power for the duration of one revolution upon every 4-th revolution, and reference height for earth straightening machines is generated with a pattern in which the rotating laser beam is emitted with a significantly reduced light power for the duration of one revolution upon every 5-th revolution).

Depending on the task of the respective machines in the site area, they can now be equipped with corresponding laser receivers set such that the latter in each case react only to the corresponding desired setpoint reference plane and ignore the further reference planes in the site area.

According to the invention, it is thus possible to ensure that the respectively correct reference plane and reference height are found and indicated rapidly, reliably and robustly.

For work for interior finishing, in particular, the laser receiver can in this case be designed as a laser receiver capable of being handheld. In this case, the evaluation unit and the indicator can be integrated into the laser receiver apparatus. With the aid of the indicator, e.g. the determined position of the laser receiver relative to the identified reference surface can be visually displayed. Additionally or alternatively separately, the indicator of the laser receiver can be designed for visually displaying whether an instantaneously incident reference surface was identified as the desired reference surface.

As already known from the prior art, it is possible in this case that as the position of the laser receiver relative to the reference surface, it is possible, by means of the evaluation unit, to determine the information of whether a defined zero point of the laser receiver is situated
- exactly at the level of the reference surface,
- above the reference surface or
- below the reference surface.

This information can then be indicated as the determined position by the indicator. As likewise known to the person skilled in the art, the laser beam detector can have for example a multiplicity of photosensitive elements.

As a further aspect according to the invention, a learning functionality can be provided (e.g. programmatically embedded into and thus provided by the evaluation unit), by means of which a learning sequence—corresponding to the emission pattern—of output signals generated by the laser beam detector in each case when the rotating laser beam repeatedly successively impinges can be detected and can be analyzed, and comparison criteria can be derived from the learning sequence, which criteria are indicated by the emission pattern and designed for being compared with a sequence of output signals generated in the context of a later measurement operation.

In particular in this case—as the comparison criteria—information regarding periodically recurring differences in the amplitudes of the individual output signals within the learning sequence can be derived and can be stored.

To summarize, therefore, the apparatus combination according to the invention comprising rotation laser and laser receiver offers a high flexibility even in the case of replacement—e.g. necessitated owing to failure—of receiver or rotation laser of an apparatus combination and in the high modularity or combinability/extendibility with further components of further similar apparatus combinations, wherein a possibility of unambiguous assignment of in each case two components or the identification of a specific, selected rotation laser on the part of the receiver is nevertheless ensured. Moreover, according to the invention, it is now also possible to react in the short term to specific conditions (e.g. on site at a construction site and the equipment already present and used there).

Specifically, the intention here is to make it possible in a simple manner to attune the apparatuses mutually to one another (i.e. to bring about an unambiguous cooperation of the apparatus combination) in a user-friendly manner only shortly before said apparatuses are used, without this necessitating that diverse components of the two interacting apparatuses be coordinated with one another in respect of hardware in a predefined manner and in a manner that makes modularity impossible (e.g. with regard to the wavelength or the manner of modulation of the laser beam with corresponding hardware design of the laser source on the emitter side and/or of the laser beam detector on the receiver side).

The invention furthermore relates to a rotation laser for such a construction laser system described above, said rotation laser having a laser unit and a rotatable deflection means and being designed for emitting a rotating laser beam, wherein the rotating laser beam defines a reference surface. In this case, the invention provides a controller for the laser unit, which controller is designed in such a way that a known emission pattern is generated over a sequence of a plurality of revolutions by varying the emission of the laser beam in a manner temporally coupled to the revolution duration of the deflection means, such that on the basis of a sequence of output signals generated by a laser beam detector of a laser receiver in each case when the rotating laser beam repeatedly successively impinges, which sequence corresponds to the known emission pattern, the reference surface can be identified by an evaluation unit of the construction laser system.

Furthermore, the invention also relates to a laser receiver, in particular capable of being handheld, for such a construction laser system described above, said laser receiver being designed for determining a position relative to a reference surface defined by a rotating laser beam, and having
- a laser beam detector having a multiplicity of photosensitive elements and being designed for generating an output signal where the laser beam impinges on the laser beam detector,
- an evaluation unit for determining the position of the laser receiver relative to the reference surface, and
- an indicator for the position determined, in particular designed for indicating whether the laser receiver exactly coincides with the reference surface.

In this case, according to the invention, the evaluation unit is designed for identifying the reference surface on the basis of a sequence of output signals generated by the laser beam detector in each case when the rotating laser beam repeatedly successively impinges, which sequence corresponds to a known emission pattern—generated by varying the emission of the rotating laser beam over a sequence of a plurality of revolutions.

In addition, the invention relates to a method for determining a position of a laser receiver relative to a reference surface, in particular for indicating whether the laser receiver exactly coincides with the reference surface.

In this case, the following steps are provided:
- emitting a rotating laser beam, wherein the rotating laser beam defines the reference surface,
- detecting the laser beam with the aid of a laser beam detector of the laser receiver, and generating an output signal when the laser beam impinges on the laser beam detector, determining the position of the laser receiver relative to the reference surface, and indicating the position determined, in particular indicating whether a defined zero point of the laser receiver coincides with the reference plane.

According to the invention, in the context of the method, the following steps are now additionally performed:

varying the emitting of the rotating laser beam in such a way that as a result at least in the direction of the laser receiver a known emission pattern is generated over a sequence of revolutions of the rotating laser beam, and identifying the reference surface on the basis of a sequence of output signals generated by the laser beam detector in each case when the rotating laser beam repeatedly successively impinges, which sequence corresponds to the known emission pattern.

In particular, in this case, varying the emitting of the rotating laser beam—for the purpose of generating the emission pattern—is effected in a manner coupled temporally to the revolution duration of the rotating laser beam and as a result at least in the direction of the laser receiver the emission pattern is generated over a sequence of revolutions of the rotating laser beam.

The developments and advantageous aspects described above with regard to the construction laser system according to the invention can—as is self-explanatory to the person skilled in the art—analogously also be transferred and applied to the rotation laser according to the invention, to the laser receiver according to the invention and also to the method according to the invention.

BRIEF DESCRIPTION OF THE DRAWINGS

The method according to the invention and the device according to the invention are described in greater detail purely by way of example below on the basis of concrete exemplary embodiments illustrated schematically in the drawings, further advantages of the invention also being discussed. Specifically in the figures.

DETAILED DESCRIPTION

Figure 1:
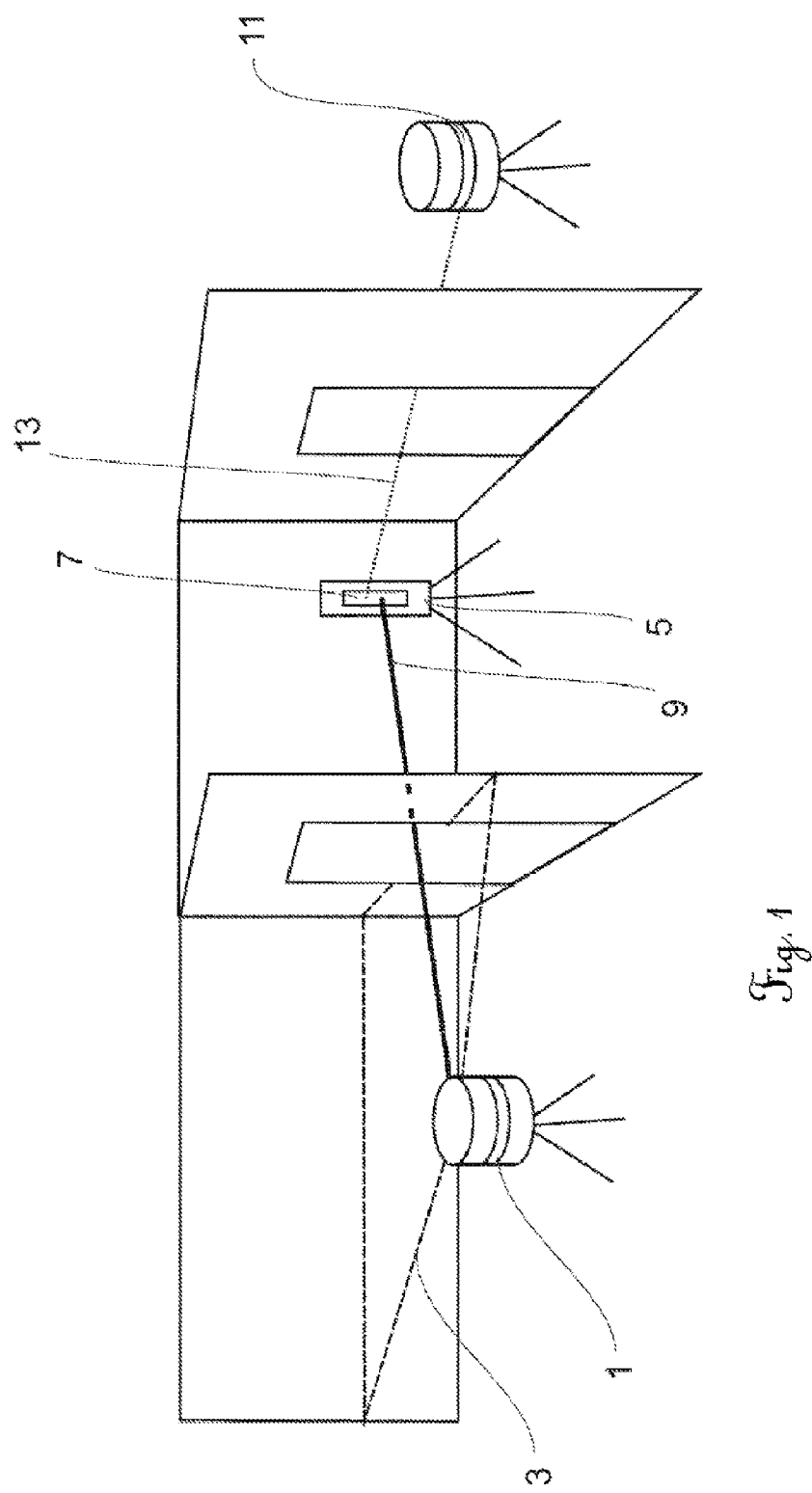
FIG. 1 schematically shows a construction site situation in which the invention is used.

FIG. 1 reveals a situation in which a construction laser system according to the invention is used. A rotation laser 1 is situated in a first room of a building, within the rotation laser a deflection prism rotates with a defined rotational speed. A laser beam incident on the deflection prism is formed as a laser reference plane 3 by said prism. The laser reference plane intersects the walls of the room in which the rotation laser is installed. The lines of intersection become visible on the walls in the form of reference lines and serve as a basis e.g. for carrying out line installations, hanging pictures, arranging furniture, etc.

A laser receiver 5 is arranged in an adjoining room. Said laser receiver serves, by means of a digital laser light sensor 7, to detect and amplify a laser beam or laser pulse 9 lying in the laser reference plane 3, in order to form in the adjoining room a reference plane corresponding to the laser reference plane 3 (said reference plane not being illustrated in FIG. 1, however, in order to avoid a lack of clarity). Since, moreover, such laser receivers and a corresponding method have already been described in the document EP 2 199 739 A1, a detailed explanation will not be given at this juncture.

As is furthermore evident from FIG. 1, a second rotation laser 11 is situated in a further adjoining room, said second rotation laser likewise forming a laser reference plane, of which only a laser beam 13 or laser pulse 13 is illustrated in FIG. 1. Said laser beam 13 is likewise regularly incident on the laser light sensor 7 of the laser receiver 5 in accordance with the rotational speed of the deflection prism of the second rotation laser 11.

Before the laser receiver 5 was arranged in the adjoining room, the laser receiver 5 was set to a pattern emitted by the rotation laser 1. This is because the laser pulse 9 from the rotation laser 1 is incident on the laser light sensor 7 at regular intervals in accordance with the rotational speed of the deflection prism in the rotation laser 1. Moreover, in accordance with one preferred exemplary embodiment, every fifth pulse is interrupted by virtue of the laser beam being switched off during every fifth revolution of the deflection prism. This pattern is illustrated schematically in FIG. 2a. Vertical dotted lines in FIGS. 2a to 2c represent a delimitation of the patterns illustrated there.

Since the pattern is stored in the laser receiver 5, the latter is able to recognize whether an incident laser pulse is the laser pulse 9 from the rotation laser 1 or the laser pulse 13 from the second rotation laser 11, which is set to a different rotational speed and a different pattern than the rotation laser 1.

In specific cases, however, it may be necessary for the laser receiver to be able to recognize and process the pulses from two different rotation lasers 1 and 11. In such a case, in accordance with one modification of the embodiment, it is possible to store the two different patterns of the two rotation lasers 1, 11. The individual patterns can be differentiated firstly by means of the point in time at which the laser pulses 9 and 13 impinge, or secondly also by means of the region of the laser light sensor 7 in which the laser pulses 9 and 13 impinge, thereby giving rise to different electrical outputs, which are compared with the stored patterns.

Figure 2:
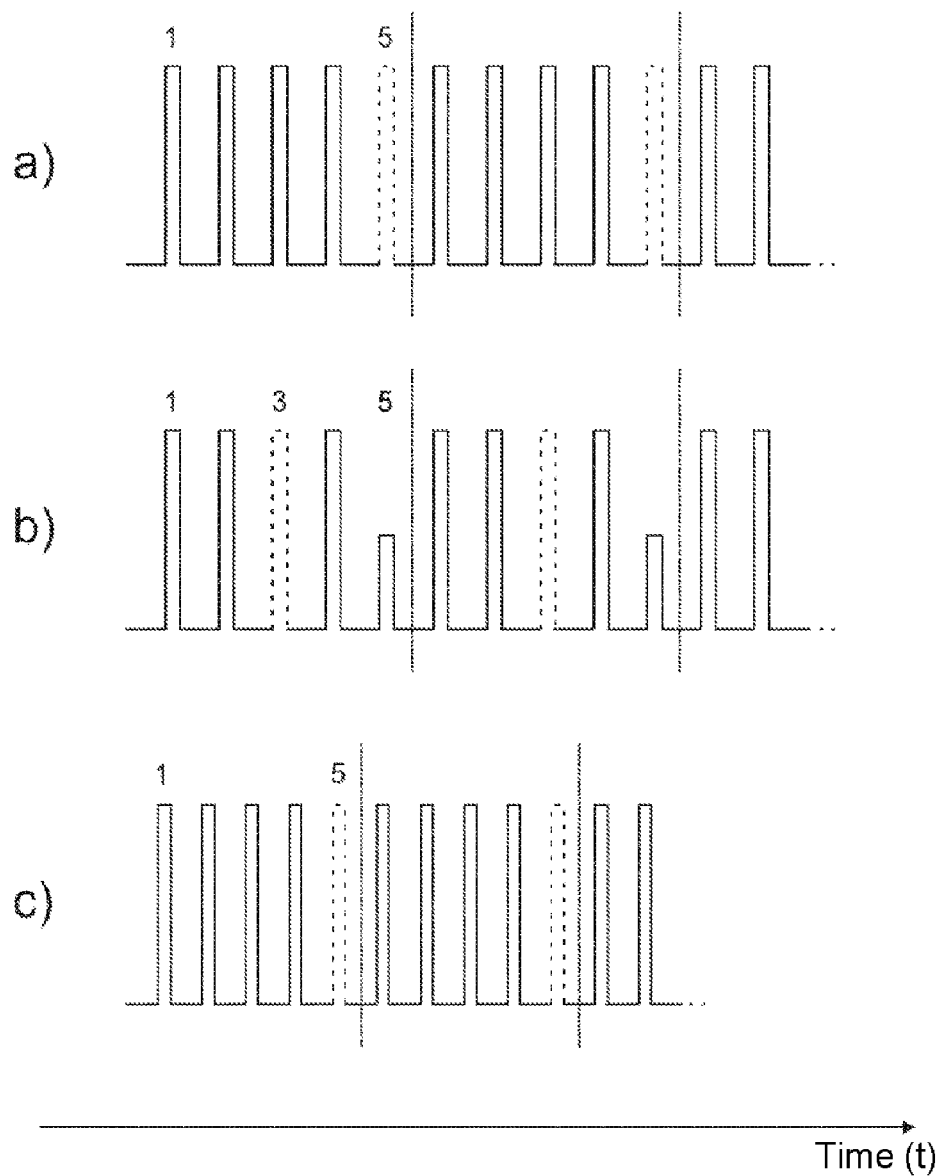
FIG. 2 shows examples of various emission patterns which are employed according to the invention.

As an example of different time durations of a pattern, reference should be made by way of example to FIGS. 2a and 2c, which show the same pattern, in which every fifth pulse is suppressed. However, the two patterns differ with regard to the rotational speeds of the deflection prisms, for which reason the pulses arrive at the laser receiver 5 at different times. Since the respective points in time are stored in the laser receiver, reliable assignment of the respective pulses 9 and 13 to the rotation lasers 1 and 11 is ensured.

Since the rotation lasers can operate in a rotational speed range of between e.g. 7 and 20 revolutions per second (7 to 20 rps), the pulse spacings are, for instance, in the tenths of a second range. Given a rotational speed of the deflection prism of 10 rps, the pulse duration itself, that is to say the time period during which the pulse is incident on the laser light sensor, is in this case in a range of approximately 5 microseconds (5 µs). Therefore, it is possible to realize the different pulses by a simple change in the rotational speed of the deflection prisms and the different patterns by means of simple technical means—such as e.g. preprogramming of a few different patterns, which can be selected later on the part of the user, in the apparatus software. Moreover, it is also possible for a defined, desired emission pattern to be input only shortly before use.

Therefore, the apparatus combination according to the invention comprising rotation laser and laser receiver offers a high flexibility even in the case of replacement—e.g. necessitated owing to failure—of receiver or rotation laser of an apparatus combination and in the high modularity or combinability/extendibility with further components of further similar apparatus combinations, wherein a possibility of unambiguous assignment of in each case two components or the identification of a specific, selected rotation laser on the part of the receiver is nevertheless ensured. Moreover, according to the invention, it is now also possible to react in the short term to specific conditions (e.g. on site at a construction site and the equipment already present and used there).

Specifically, the intention here is to make it possible in a simple manner to attune the apparatuses mutually to one another (i.e. to bring about an unambiguous cooperation of the apparatus combination) in a user-friendly manner only shortly before said apparatuses are used, without this necessitating that diverse components of the two interacting apparatuses be coordinated with one another in respect of hardware in a predefined manner and in a manner that makes modularity impossible (e.g. with regard to the wavelength or the manner of modulation of the laser beam with corresponding hardware design of the laser source on the emitter side and/or of the laser beam detector on the receiver side).

Another possibility for generating distinguishable patterns consists in amplifying or attenuating one or more pulses with regard to the signal amplitude thereof, instead of allowing one or more pulses to be completely omitted. By way of example, reference should be made here to FIG. 2b. In FIG. 2b, the signal amplitude of the fifth pulse is attenuated by approximately 50%, while the third pulse of each pattern is completely suppressed.

The invention is not restricted, however, to the construction laser system illustrated by way of example, and in particular is not restricted to the patterns illustrated.

In particular, a pattern can have more than five pulses. This can extend so far that a pattern is defined only over a plurality of revolutions of the deflection prism.

Likewise, a pattern can consist only of attenuated pulses. The latter can be attenuated identically or to different extents, e.g. within a scope of 25% to 75% of the signal amplitude.

Moreover, a construction laser system according to the invention is not restricted to a specific number of apparatuses; in particular, it is also possible for a plurality of laser receivers to be assigned to one rotation laser or for a plurality of rotation lasers to be assigned to one or more laser receivers.

The transmission of the pattern from the rotation laser to the laser receiver can also be effected in a coded manner.

Since a digital laser receiver is used, it is also possible to recognize the patterns of different rotation lasers at different points of incidence, for example at a different height thereof.

It goes without saying that these illustrated figures schematically illustrate only possible exemplary embodiments. The different approaches can likewise be combined with one another and with methods from the prior art.

What is claimed is:

1. A construction laser system comprising:
   a rotation laser having a laser unit and a rotatable deflection means for emitting a rotating laser beam, wherein the rotating laser beam defines a reference surface;
   a laser receiver for determining a position relative to the reference surface, having a laser beam detector designed for generating an output signal when the laser beam impinges on the laser beam detector;
   an evaluation unit for determining the position of the laser receiver relative to the reference surface; and
   an indicator for the position determined, in particular designed for indicating whether the laser receiver exactly coincides with the reference surface; and
   a controller for the laser unit, which controller is designed in such a way that a known emission pattern is generated over a sequence of a plurality of revolutions by varying the emission of the laser beam in a manner temporally coupled to the revolution duration of the deflection means; and
   wherein the evaluation unit is designed for identifying the reference surface on the basis of a sequence of output signals generated by the laser beam detector in each case when the rotating laser beam repeatedly successively impinges, which sequence corresponds to the known emission pattern.

2. The construction laser system as claimed in claim 1, wherein the evaluation unit is designed for comparing the sequence of output signals generated with comparison criteria indicated by the known emission pattern, in particular wherein the comparison criteria are stored in the evaluation unit.

3. The construction laser system as claimed in claim 1, wherein the rotating laser beam impinges on the laser receiver in an impinging rhythm dependent on the revolution duration of the deflection means and the controller is designed for varying the emission of the laser beam in such a way that, as the known emission pattern, in the context of the impinging rhythm upon every n-th impingement of the rotating laser beam on the laser receiver an output signal is generated by the laser beam detector, which signal differs from the remaining output signals generated in the context of the impinging rhythm.

4. The construction laser system as claimed in claim 1, wherein the controller is designed in such a way that—as the known emission pattern—the laser beam, upon every n-th revolution, for the duration of one revolution, is emitted with a light power lying outside a defined standard light power range or is not emitted at all, in particular wherein n is chosen to be an integer between 3 and 10, for the case in which the laser beam is emitted with a light power lying outside the standard light power range upon every n-th revolution, said laser beam is emitted with a light power that significantly falls below the standard light power range upon every n-th revolution, and the evaluation unit is designed for identifying the reference surface from the fact that in the sequence of output signals every n-th output signal has an amplitude that differs from the amplitudes of the other output signals, or that every n-th output signal fails to appear in the sequence of output signals.

5. The construction laser system as claimed in claim 4, wherein the controller is designed in such a way that the laser beam is emitted with a light power lying within the standard light power range upon the other revolutions apart from upon the every n-th revolution for the duration of these other revolution.

6. The construction laser system as claimed in claim 5, wherein the laser beam is emitted with constant light power as standard light power upon the other revolutions.

7. The construction laser system as claimed in claim 1, wherein:
   the revolution rate of the deflection means can optionally be set to different values within a rotation rate range of between 7 and 20 revolutions per second; and
   the evaluation unit is designed for further identifying the reference surface additionally on the basis of the time intervals between the individual output signals within the sequence of output signals generated.

8. The construction laser system as claimed in claim 1, wherein the evaluation unit provides a learning functionality with which:
   a learning sequence, corresponding to the emission pattern, of output signals generated by the laser beam detector in each case when the rotating laser beam repeatedly successively impinges can be detected and can be analyzed; and comparison criteria can be derived from the learning sequence in such a way that they are indicated by the emission pattern and designed for being compared with a sequence of output signals generated in the context of a later measurement operation.

9. The construction laser system as claimed in claim 8, wherein, as the comparison criteria, information regarding periodically recurring differences in the amplitudes of the individual output signals within the learning sequence can be derived and can be stored.

10. The construction laser system as claimed in claim 1, wherein:

the indicator is designed in such a way that it is only in the case of the identification of the reference surface that the determined position of the laser receiver relative to said reference surface is indicated; and/or the indicator is designed for indicating whether the reference surface has been identified.

11. The construction laser system as claimed in claim 1, wherein as the position of the laser receiver relative to the reference surface, it is possible, by means of the evaluation unit, to determine the information of whether a defined zero point of the laser receiver is situated:

exactly at the level of the reference surface;

above the reference surface; or below the reference surface; and said information can be indicated as the determined position by the indicator.

12. The construction laser system as claimed in claim 1, wherein:

the laser beam detector has a multiplicity of photosensitive elements; and/or in that the evaluation unit and the indicator are integrated into the laser receiver; and the controller is integrated into the rotation laser.

13. A rotation laser for a construction laser system as claimed in claim 1, said system having a laser unit and a rotatable deflection means and being designed for emitting a rotating laser beam, wherein the rotating laser beam defines a reference surface, and a controller for the laser unit, which controller is designed in such a way that a known emission pattern is generated over a sequence of a plurality of revolutions by varying the emission of the laser beam in a manner temporally coupled to the revolution duration of the deflection means, such that on the basis of a sequence of output signals generated by a laser beam detector of a laser receiver in each case when the rotating laser beam repeatedly successively impinges, which sequence corresponds to the known emission pattern, the reference surface can be identified by an evaluation unit of the construction laser system.

14. A laser receiver capable of being handheld for a construction laser system as claimed in claim 1, said laser receiver being designed for determining a position relative to a reference surface defined by a rotating laser beam, and further comprising:

a laser beam detector having a multiplicity of photosensitive elements and being designed for generating an output signal where the laser beam impinges on the laser beam detector;

an evaluation unit for determining the position of the laser receiver relative to the reference surface; and an indicator for the position determined, wherein the evaluation unit is designed for identifying the reference surface on the basis of a sequence of output signals generated by the laser beam detector in each case when the rotating laser beam repeatedly successively impinges, which sequence corresponds to a known emission pattern generated by varying the emission of the rotating laser beam over a sequence of a plurality of revolutions.

15. A laser receiver capable of being handheld for a construction laser system as claimed in claim 14, wherein the indicator for the position determined is designed for indicating whether the laser receiver exactly coincides with the reference surface.

16. A method for determining a position of a laser receiver relative to a reference surface, comprising the steps of:

emitting a rotating laser beam, wherein the rotating laser beam defines the reference surface;

detecting the laser beam with the aid of a laser beam detector of the laser receiver;

generating an output signal when the laser beam impinges on the laser beam detector;

determining the position of the laser receiver relative to the reference surface;

indicating the position determined, in particular indicating whether a defined zero point of the laser receiver coincides with the reference plane;

varying the emitting of the rotating laser beam in such a way that as a result at least in the direction of the laser receiver a known emission pattern is generated over a sequence of revolutions of the rotating laser beam; and identifying the reference surface on the basis of a sequence of output signals generated by the laser beam detector in each case when the rotating laser beam repeatedly successively impinges, which sequence corresponds to the known emission pattern, in particular by comparing the sequence of output signals generated with comparison criteria indicated by the known emission pattern.

17. The method as claimed in claim 16, wherein the method is for indicating whether the laser receiver exactly coincides with the reference surface.

18. The method as claimed in claim 16, wherein indicating the position determined includes whether a defined zero point of the laser receiver coincides with the reference plane.

19. The method as claimed in claim 16, wherein varying the emitting of the rotating laser beam for the purpose of generating the emission pattern is effected in a manner coupled temporally to the revolution duration of the rotating laser beam and as a result at least in the direction of the laser receiver the emission pattern is generated over a sequence of revolutions of the rotating laser beam.

20. The method as claimed in claim 16, wherein the rotating laser beam impinges on the laser receiver in an impinging rhythm dependent on the revolution duration of the deflection means and varying the emitting of the laser beam is effected in such a way that, as the known emission pattern, in the context of the impinging rhythm upon every n-th impingement of the rotating laser beam on the laser receiver an output signal is generated by the laser beam detector, which signal differs from the remaining output signals generated in the context of the impinging rhythm.

21. A construction laser system comprising:

a rotation laser having a laser unit and a rotatable deflection means for emitting a rotating laser beam, wherein the rotating laser beam defines a reference surface;

a laser receiver for determining a position relative to the reference surface, having a laser beam detector designed for generating an output signal when the laser beam impinges on the laser beam detector;

an evaluation unit for determining the position of the laser receiver relative to the reference surface; and an indicator for the position determined, in particular designed for indicating whether the laser receiver exactly coincides with the reference surface; and a controller for the laser unit, which controller is designed in such a way that a known emission pattern is generated over a sequence of a plurality of revolutions by varying the emission of the laser beam in a manner temporally coupled to the revolution duration of the deflection means; and wherein the evaluation unit is designed for identifying the reference surface on the basis of a sequence of output signals generated by the laser beam detector in each case when the rotating laser beam repeatedly successively impinges, which sequence corresponds to the known emission pattern, and wherein the evaluation unit is designed for comparing the sequence of output signals generated with comparison criteria indicated by the known emission pattern, in particular wherein the comparison criteria are stored in the evaluation unit.

* * * * *